(12) United States Patent
Hayashida et al.

(10) Patent No.: US 6,866,884 B2
(45) Date of Patent: Mar. 15, 2005

(54) OPTICAL INFORMATION MEDIUM

(75) Inventors: Naoki Hayashida, Tokyo (JP); Hideki Hirata, Tokyo (JP)

(73) Assignee: TDK Corporation, Tokyo (JP)

(*) Notice: Subject to any disclaimer, the term of this patent is extended or adjusted under 35 U.S.C. 154(b) by 83 days.

(21) Appl. No.: 10/443,033

(22) Filed: May 22, 2003

(65) Prior Publication Data

US 2003/0211276 A1 Nov. 13, 2003

Related U.S. Application Data

(62) Division of application No. 09/829,067, filed on Apr. 10, 2001, now Pat. No. 6,596,363.

(30) Foreign Application Priority Data

| Apr. 10, 2000 | (JP) | 2000-107681 |
| Oct. 10, 2000 | (JP) | 2000-309218 |
| Mar. 12, 2001 | (JP) | 2001-068761 |

(51) Int. Cl.$^7$ .................................................. B05D 5/06
(52) U.S. Cl. ..................... 427/164; 427/162; 428/64.1; 428/64.4; 430/270.11
(58) Field of Search .................. 430/270.11, 495.1; 428/64.1, 64.4, 64.6; 369/275.2; 427/162, 164

(56) References Cited

U.S. PATENT DOCUMENTS 4,695,510 A 9/1987 Sawamura et al. ......... 428/336

FOREIGN PATENT DOCUMENTS

| EP | 0 552 636 | 7/1993 |
| EP | 0 652 555 | 5/1995 |
| EP | 0 923 072 | 6/1999 |
| JP | 63-047195 | 2/1988 |
| JP | 2-107630 | 4/1990 |
| JP | 3-141048 | 6/1991 |
| JP | 5-089518 | 4/1993 |
| JP | 6-187663 | 7/1994 |
| JP | 6-349119 | 12/1994 |
| JP | 9-100111 | 4/1997 |
| JP | 10-110118 | 4/1998 |
| JP | 11-007657 | 1/1999 |
| JP | 11-185313 | 7/1999 |
| JP | 11-203726 | 7/1999 |
| JP | 11-213444 | 8/1999 |
| WO | WO 99/66502 | 12/1999 |

*Primary Examiner*—Shrive P. Beck
*Assistant Examiner*—David Turocy
(74) *Attorney, Agent, or Firm*—Oblon, Spivak, McClelland, Maier & Neustadt, P.C.

(57) ABSTRACT

An optical information medium which has excellent abrasion resistance and which further exhibits sufficient smudge-proof properties is provided. The optical information medium is coated on at least one surface with a film of a silane coupling agent containing a water- or oil-repellent substituent, said silane coupling agent being represented by the following formula (1): $R_1$—Si(X)(Y)(Z) wherein $R_1$ is the water- or oil-repellent substituent; X, Y and Z are independently a monovalent group; and at least one of X, Y and Z is a group which is capable of forming Si—O—Si bond by polycondensation with silanol group; and said medium has an underlying layer formed in contact with said silane coupling agent film, and at least the surface of said underlying layer comprises a compound having a chemical bond represented by the formula (2): M—A wherein M is a metal atom (including a semimetal), and A is a chalcogen atom selected from O, S, Se, and Te, nitrogen atom, or carbon atom.

21 Claims, 2 Drawing Sheets

LASER BEAM

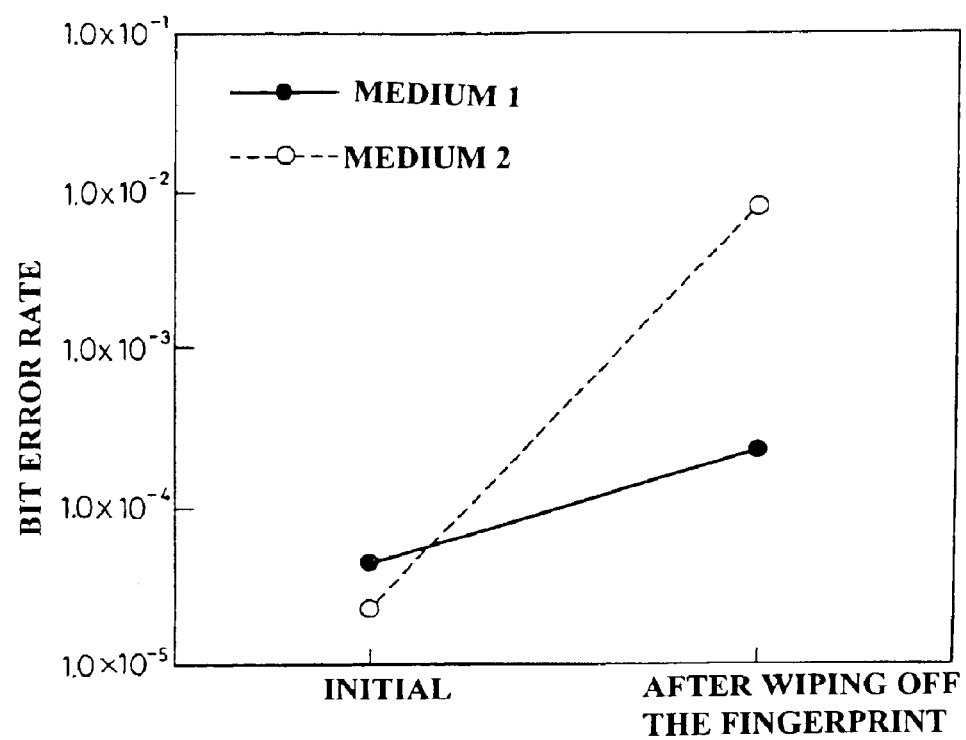

OPTICAL INFORMATION MEDIUM

CROSS REFERENCE TO RELATED APPLICATIONS

This application is a divisional of application Ser. No. 09/829,067, filed Apr. 10, 2001, now U.S. Pat. No. 6,596,363.

BACKGROUND OF THE INVENTION

1. Field of the Invention

This invention relates to an optical information medium such as read only optical disk and optical recording disk.

2. Prior Art

Optical materials most typically used for light-transmitting layer and the like of an optical information medium are polycarbonate- and polymethyl methacrylate-based materials in view of their favorable moldability, transparency, price, and the like. These materials, however, suffer from insufficient abrasion resistance, and their high electric insulation invites high susceptibility for electric charge, and a large amount of dust is likely to become attached to the surface of the medium during their storage or use to result in errors in the recording and reading of the optical information.

A countermeasure generally taken for such problem is application of a transparent, scratch-resistant hard coat on the light-transmitting layer of the medium. The process most popularly employed in such case is coating of a curable compound having at least two polymerizable functional groups such as acryloyl group in the molecule on the light-transmitting layer followed by curing with UV or other active energy beam to thereby form a protective layer. Although the protective layer formed from such UV-curable resin may be superior in abrasion resistance compared to the surface of the resin such as polycarbonate or polymethyl methacrylate, the level of the abrasion resistance achieved is limited to a certain level and such level is not the level of the scratch resistance sufficient for use in the optical information medium. In addition, these hard coatings are provided only for the purpose of imparting the surface with the scratch resistance, and a smudge-proof surface which is resistant to attachment of dust or oil mist in the air, fingerprint, and the like is not expectable.

Also proposed is application of a hard coat imparted with anti-static property for prevention of dust attachment as well as sufficient scratch resistance on the substrate on the side of the recording/reading beam incidence. For example, Japanese Patent Application Laid-Open No. (JP-A). 239946/1985 and JP-A 276145/1986 propose addition as an anti-static agent of a cationic amine, an anionic alkylbenzene sulfonate, a nonionic polyol, or ethylene oxide of an alkylphenol, and amphoteric imidazoline or alanine metal salt. JP-A 173949/1991 proposes addition of a lauryl compound, and JP-A 80267/1992 proposes addition of thiocyanic acid and an anionic surfactant containing alkylene glycol chain. These surfactants all have smudge proof effects for inorganic substances such as dust. These methods, however, are substantially ineffective in preventing organic smudges such as fingerprint and oil mist. Furthermore, the surface abrasion resistance of the light-transmitting layer in these proposals is equivalent or inferior to that of the conventional hard coats formed by using a UV-curable resin, and the scratch resistance sufficient for practical use is not at all realized.

A hard coat having smudge-proof properties for organic contaminants is proposed in JP-A 110118/1998 wherein the hard coating material used has a non-crosslinked fluorosurfactant kneaded therein. The hard coat obtained by this method, however, is insufficient in water- and oil-repellency since only a small part of the fluorocompound is exposed to the hard coat surface. When the amount of the fluorosurfactant added to the hard coating material is increased in order to secure sufficient water- and oil-repellent function, the resulting hard coat will suffer from reduced hardness, poor optical properties due to leaching of the excessive surfactant, and handling inconvenience.

As a countermeasure for such problem, JP-A 213444/1999 proposes coating of a fluoropolymer on the surface of the conventional optical disk substrate comprising polycarbonate or the like, and in this application, the water- and oil-repellency is imparted by coating the fluoropolymer on the resin substrate of the opt cal disk. In contrast to the method wherein a lubricant or the like is kneaded in the hard coating material, the water- and oil-repellent compound of this application is exposed to the entire surface of the hard coat film and sufficient smudge-proof properties are thereby realized. The fluoropolymer of this method, however, suffers from extremely poor adhesion to the underlying substrate since the fluoropolymer is only physically adsorbed to the underlying substrate by van der Waals force, and the surface treatment with the fluoropolymer is associated with a serious problem of poor durability. JP-A 187663/1994 proposes coating of an acrylic resin surface with a water- and oil-repellent compound by coupling reaction. In this method, a smudge-proof film exhibiting higher adhesion to the underlying surface compared to the JP-A 213444/1999 is provided by coating a water- and oil-repellent compound containing silyl group on the surface of an acrylic resin containing a hydrophilic substituent.

However, the acrylic resins disclosed in the JP-A 187663/1994 are required to contain an adequate amount of hydroxyl group in the polymer chain to thereby enable adsorption of the water- and oil-repellent compound by coupling reaction. This inevitably results in the limited choice of the acrylic resin. In addition, density of the hydroxyl group should be increased to achieve sufficient adhesion between the hard coat surface and the water- and oil-repellent compound, and this may result in the reduced hardness of the hard coat. Alternatively, the hydrophilicity of the hard coat surface may be raised by high energy beam treatment such as plasma or corona discharge treatment. Such treatment, however, is not sufficient in effectively enabling the coupling reaction with the water- and oil-repellent agent, and the satisfactory adhesion is less likely to be achieved solely by this method.

JP-A 203726/1999 discloses a method for improving the scratch resistance of the surface of a resin light-transmitting layer. In this method, two or more inorganic material layers of SiN or SiO are formed by vapor deposition such as sputtering to a total thickness of approximately several hundred nm on the light-transmitting layer comprising a UV-curable resin. However, it is quite difficult to obtain a scratch resistance of practically acceptable level by forming an inorganic film of such thickness.

SUMMARY OF THE INVENTION

An object of the present invention is to provide an optical information medium having a light-transmitting layer exhibiting high scratch resistance of practically acceptable level. Another object of the present invention is to provide an optical information medium wherein the light-transmitting layer or the supporting substrate is imparted with smudge-proof properties for organic contaminants such as oil mist and fingerprint (improved readiness for removal of the contaminant) without detracting from the scratch resistance of the light-transmitting layer, and in other words, an optical information medium wherein stable recording/reading is enabled for a prolonged period even if the medium is used as a medium unaccommodated in a cartridge, shell, or caddy, namely, with its surface exposed to contact by fingers and the like. A further object of the present invention is to improve lubricity and durability of the surface on the side of the optical head in a magneto-optical disk used in magnetic field modulation process.

In order to solve the problems as described above, the inventors of the present invention have conducted various investigations for the surface protective layer of the optical information medium. It was then found that it is effective to provide a light-transmitting layer exhibiting excellent scratch resistance comprising a resin and/or a metal (including a semimetal) compound, or hard carbon (DLC) (preferably, separately from the supporting substrate) on the surface of the optical information medium. It was also found that it is effective to provide an underlying layer (which may also function as other constituent member of the medium) exhibiting excellent scratch resistance on the surface of the optical information medium and to further apply a water- and oil-repellent film exhibiting excellent adhesion on the underlying layer.

To be more specific, the present is as described below.

(1) An optical information medium to be optically recorded and/or read, wherein said medium is coated on at least one surface with a film of a silane coupling agent containing a water- or oil-repellent substituent, said silane coupling agent being represented by the following formula (1):

$$R_1\text{—Si}(X)(Y)(Z) \quad (1)$$

wherein $R_1$ is the water- or oil-repellent substituent; X, Y and Z are independently a monovalent group; and at least one of X, Y and Z is a group which is capable of forming Si—O—Si bond by polycondensation with silanol group; and said medium has an underlying layer formed in contact with said silane coupling agent film, and at least the surface of said underlying layer comprises a compound having a chemical bond represented by the formula (2):

$$M\text{—A} \quad (2)$$

wherein M is a metal atom (including a semimetal), and A is a chalcogen atom selected from O, S, Se, and Te, nitrogen atom, or carbon atom.

(2) An optical information medium according to the above (1) wherein the surface of the underlying layer coated with said silane coupling agent comprises an active energy beam-curable resin containing a metal (including semimetal) chalcogenide particle, and said metal chalcogenide particle has an average particle size of up to 500 nm.

(3) An optical information medium to be optically recorded and/or read, wherein said medium is coated on at least one surface with a film of a silane coupling agent containing a water- or oil-repellent substituent, said silane coupling agent being represented by the following formula (1):

$$R_1\text{—Si}(X)(Y)(Z) \quad (1)$$

wherein $R_1$ is the water- or oil-repellent substituent; X, Y and Z are independently a monovalent group; and at least one of X, Y and Z is a group which is capable of forming Si—O—Si bond by polycondensation with silanol group; and said medium has an underlying layer formed in contact with said silane coupling agent film, and said underlying layer has a surface comprising a thin layer of a metal (including a semimetal) compound having a thickness of up to 1 μm formed in contact with said silane coupling agent film, and a metal is (including a semimetal) compound-containing layer having a thickness thicker than said thin layer is formed in contact with said thin layer and on the side opposite to said silane coupling agent film.

(4) An optical information medium according to the above (3) wherein said metal (including a semimetal) compound-containing layer formed in contact with said thin layer comprises an active energy beam-curable resin containing particles of a metal compound selected from a metal (including semimetal) chalcogenide, a metal (including semimetal) nitride, and a metal (including semimetal) carbide; and said metal compound particle has an average particle size of up to 500 nm.

(5) An optical information medium according to the above (3) wherein said metal (including a semimetal) compound-containing layer formed in contact with said thin layer comprises a composition containing a hydrolyzable metal (including semimetal) compound.

(6) An optical information medium according to the above (3) wherein said metal (including a semimetal) compound-containing layer formed in contact with said thin layer comprises a compound containing a poylsilazane.

(7) An optical information medium according to any one of the above (1) to (6) wherein the substituent $R_1$ in formula (1) is a water- or oil-repellent fluorohydrocarbon substituent.

(8) An optical information medium according to any one of the above (1) to (7) wherein at least one of X, Y and Z in formula (1) is selected from a halogen, —OH, —OR$_2$ (wherein $R_2$ is an alkyl group), —OC(O)CH$_3$, —NH$_2$ and —N=C=O.

(9) An optical information medium according to any one of the above (1) to (8) wherein said medium has a supporting substrate, and the recording and/or the reading is accomplished by irradiating a light beam from the side of said supporting substrate, and said silane coupling agent film is formed on the side of the light beam incidence.

(10) An optical information medium according to the above (9) wherein said optical information medium is a magneto-optical disk used by magnetic field modulation process which has a recording layer formed on the supporting substrate, wherein the recording and the reading is accomplished by irradiating a light beam from the side of said supporting substrate, and wherein a magnetic head is run on the side of said recording layer, and said disk is coated with said silane coupling agent film on both the side of the light beam incidence and the side of the magnetic head.

(11) An optical information medium comprising a supporting substrate and a film layer formed on the supporting substrate to be optically recorded and/or read by a light beam irradiated from the side of said supporting substrate or said film layer, wherein said medium is coated on the side of the light incidence with a thin layer having a thickness of up to 1 A1 comprising a metal (including a semimetal) compound selected from a metal (including semimetal) chalcogenide, a metal (including semimetal) nitride, and a metal (including semimetal) carbide, and a metal (including a semimetal) compound-containing layer having a thickness thicker than said thin layer is formed in contact with said thin layer and on the side opposite to the side of the light incidence.

(12) An optical information medium comprising a supporting substrate and a film layer formed on the supporting substrate to be optically recorded and/or read by a light irradiated from the side of said supporting substrate or said film layer, wherein said medium is coated on the side of the light incidence with a thin layer having a thickness of up to 1 μm comprising hard carbon (diamond like carbon), and a metal (including a semimetal) compound-containing layer having a thickness thicker than said thin layer formed in contact with said thin layer and on the side opposite to the side of the light incidence.

(13) An optical information medium according to the above (11) or (12) wherein said metal (including a semimetal) compound-containing layer formed in contact with said thin layer comprises an active energy beam-curable resin containing particles of a metal compound selected from a metal (including semimetal) chalcogenide, a metal (including semimetal) nitride, and a metal (including semimetal) carbide; and said metal compound particle has an average particle size of up to 500 nm.

(14) An optical information medium according to the above (11) or (12) wherein said metal (including a semimetal) compound-containing layer formed in contact with said thin layer comprises a composition containing a hydrolyzable metal (including semimetal) compound.

(15) An optical information medium according to the above (11) or (12) wherein said metal (including a semimetal) compound-containing layer formed in contact with said thin layer comprises a compound containing a polysilazane.

(16) An optical information medium comprising a supporting substrate and a film layer formed on the supporting substrate which is optically recorded and/or read by irradiating a light beam from the side of said supporting substrate or said film layer, wherein said medium is formed on the side of the light incidence with a light-transmitting layer; and at least a part of said light-transmitting layer comprises an active energy beam-curable resin containing particles of a metal compound selected from a metal (including semimetal) chalcogenide, a metal (including semimetal) nitride, and a metal (including semimetal) carbide; and said metal compound particle has an average particle size of up to 500 nm.

(17) An optical information medium according to any one of the above (4), (13), or (16) wherein said metal compound particle is a metal chalcogenide particle.

(18) An optical information medium according to any one of the above (2), (4), (13), or (17) wherein said metal chalcogenide particle is silica particle.

BRIEF DESCRIPTION OF THE DRAWINGS

FIG. 3 is a graph showing alteration in the error rate before deposition of the fingerprint (initial) and after wiping of the fingerprint.

DETAILED DESCRIPTION OF THE INVENTION

Figure 1:
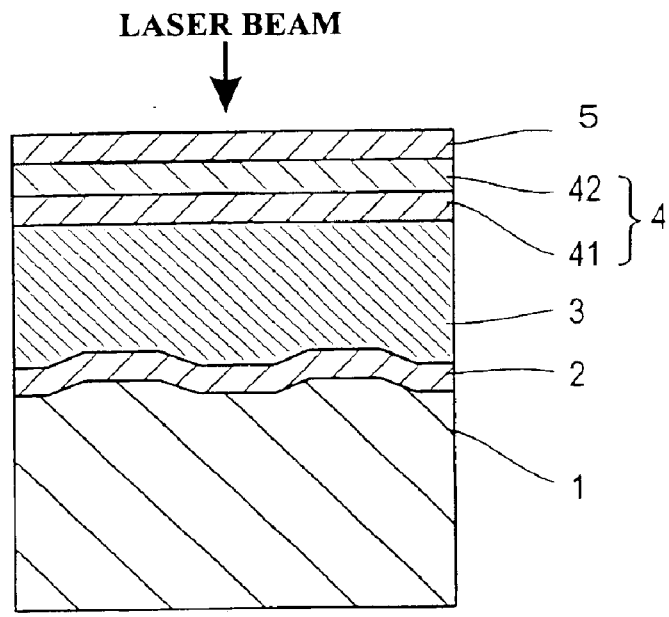
FIG. 1 is a cross sectional view of the optical recording medium according to an embodiment of the present invention.

Next, the present invention is described in detail.

The optical information medium of the present invention is coated on at least one surface with a film of a silane coupling agent represented by the following formula (1) containing a water- or oil-repellent substituent. The medium has an underlying layer formed in contact with said film of silane coupling agent, and at least the surface of said underlying layer in contact with said silane coupling agent film comprises a compound having a chemical bond represented by the formula (2) such as Si—O bond. The film of the silane coupling agent formed is a monomolecular film or a thin film resembling a monomolecular film because of the chemisorption reaction mechanism, and therefore, performance of the underlying surface, namely, the surface including the chemical bond moiety represented by the formula (2) is directly reflected to the surface of the medium with regard to hardness, scratch resistance and other mechanical properties of the medium. Accordingly, by constituting the surface of the medium as described above, a remarkable improvement in the scratch resistance of the surface of the optical information medium as well as provision of the smudge-proof properties without detracting from such scratch resistance are enabled. At the same time, the smudge-proof surface could be imparted with high durability. To be more specific, the silane coupling agent undergoes chemisorption reaction with the chemical bond moiety such as Si—O bond represented by formula (2) in the compound contained in the medium surface in contact with the silane coupling agent, and therefore, the silane coupling film firmly adheres to the underlying surface and simultaneously exerts water- and oil-repellent function to thereby realize the smudge-proof properties with improved readiness for contaminant removal. Therefore, the medium does not suffer from serious contamination problem when it is used without being accommodated in a cartridge, shell, or caddy. In addition, the underlying surface containing the chemical bond moiety such as Si—O bond represented by formula (2) exhibits excellent durability as well as sufficient scratch resistance, and these properties synergistically functions with the smudge-proof properties. These merits are also realized with no adverse effects on other performance of the medium.

Alternatively, the medium may be provided with an underlying layer comprising two or more layers instead of the underlying layer surface as described above in order to improve the adhesion with the silane coupling agent film and the scratch resistance. The underlying layer may comprise a thin layer (with a film thickness of up to 1 μm) of a metal (including a semimetal) compound formed as a surface layer in contact with the silane coupling agent film, and a metal (including a semimetal) compound-containing layer formed as an inner layer in contact with said thin layer and on the side opposite to said silane coupling agent film. In this case, the inner layer has a thickness thicker than the thin layer. The metal compound thin layer formed as the surface layer comprises a metal compound as its major component, and the thin layer preferably comprises 90% (mass %) or more of the metal compound.

The optical information medium of the present invention comprises a supporting substrate of a resin, glass, or the like and one ore more film layers at least including a recording layer or a reflective layer disposed on the supporting layer, and the medium is recorded and/or read by irradiating the film layer with laser beam or other light.

The medium may be irradiated with the light either from the side of the supporting substrate, or from the side of the film layer. Alternatively, the medium may further comprise a supporting substrate or a protective layer of a resin, glass, or the like disposed on the film layer, and the medium may be recorded and/or read by irradiating the light beam from the surface of such layer.

The present invention is most effective when it is applied to a light-transmitting layer through which the recording/reading beam is irradiated. In the case of a magneto-optical disk of magnetic field modulation type, the light beam is generally irradiated from the side of the supporting substrate, and the present invention is effective when it is applied to the side of the light beam incidence. The present invention, however, is also highly effective when it is applied to the side opposite to the light-transmitting layer since the magnetic head moves on the side of the recording layer of the magneto-optical disk, namely, on the organic protective layer covering the recording layer, and the surface of the protective layer should have an improved lubricity and durability.

Furthermore, when improvement in the scratch resistance and other mechanical strength of the surface of the optical information medium is the main object, the medium may be provided at least on the side of the light incidence with a light-transmitting layer containing at least in a part thereof an active energy beam-curable resin containing metal compound particles such as metal (including semimetal) chalcogenide particles (average particle size, up to 500 nm) without combining the light-transmitting layer with the overlying film of silane coupling agent as described above. Such embodiment is also advantageous in the present invention. In addition, it is also effective to provide the underlying layer comprising two or more layers such that the layer corresponding to the surface layer is arranged at least on the side of the light incidence, and in such a case, the layer may be formed either from the material as described above for the surface layer or hard carbon (DLC).

Figure 2:
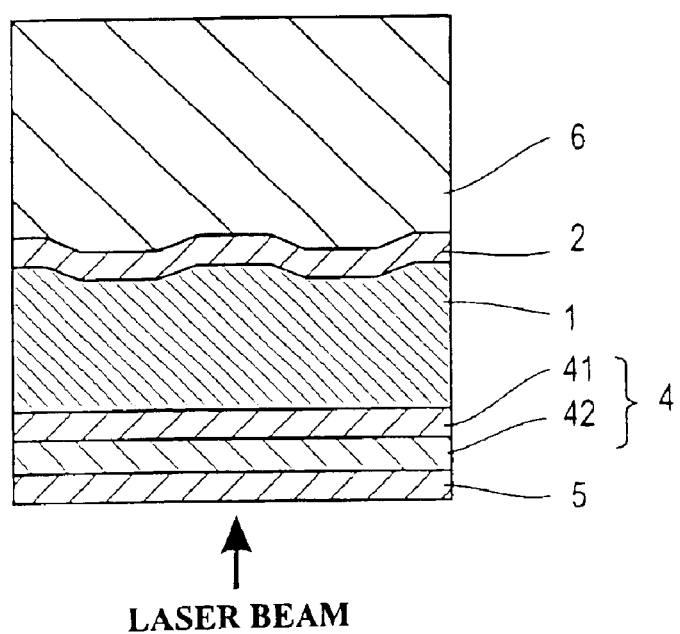
FIG. 2 is a cross sectional view of the optical recording medium according to another embodiment of the present invention.

Typical constitutions of the optical information medium of the present invention are shown in FIGS. 1 and 2.

The optical information medium shown in FIG. 1 comprises a substrate 1, a recording layer 2 disposed on the substrate 1, and a light-transmitting layer 3 disposed on the recording layer 2. On the light transmitting layer 3 are formed an underlying layer 4 and a silane coupling agent film 5 in this order. The underlying layer 4 comprises an inner layer 41 on the side of the light-transmitting layer 3 and a surface layer 42 on the side of the silane coupling agent film 5. The recording/reading laser beam enters the medium from the side of the light-transmitting layer 3 through the silane coupling agent film 5 and the underlying layer 4.

In the constitution of FIG. 1, various modification may be made within the scope of the present invention as described above. For example, when the silane coupling agent film 5 is provided, the silane coupling agent film 5 may be formed by using the inner layer 41 for its underlying layer without providing the surface layer 42, and such inner layer may also constitute a part or all of the light-transmitting layer 3. Depending on the intended use of the medium, the medium may be provided with no silane coupling agent film 5, and in this case, the underlying layer 4 may serve the surface layer of the medium. The medium may be also provided with no surface layer 42 with the inner layer 41 of particular composition serving as the surface layer, and such inner layer may also constitute a part or all of the light-transmitting layer 3.

On the other hand, the optical information medium shown in FIG. 2 comprises a supporting substrate 1, and a recording layer 2 and a protective layer 6 formed on the supporting substrate 1 in this order. On the supporting substrate 1 are formed an underlying layer 4 and a silane coupling agent film 5 in this order on the surface opposite to the recording layer 2. The underlying layer 4 comprises two layers, namely an inner layer 41 on the side of the supporting substrate 1 and a surface layer 42 on the side of the silane coupling agent film 5. The recording/reading laser beam enters the medium from the side of the supporting substrate 1 which also serve as the light-transmitting layer through the silane coupling agent film 5 and the underlying layer 4.

Various modification may be made in the constitution of FIG. 2 as in the case of FIG. 1. The supporting substrate 1 and the inner layer 41, however, may preferably comprise separate members.

The optical information medium of the present invention is not limited to the embodiments shown in the drawings, and various other embodiments are possible.

The present invention is described in further detail.

In the embodiment of the present invention wherein the medium is used in combination with the water- and oil-repellent silane coupling agent, the surface of the underlying layer which is to be covered with the water- and oil-repellent silane coupling agent should comprise a composition containing a compound having a chemical bond represented by formula (2) such as Si—O bond, namely, a composition containing a chemical bond moiety represented by formula (2):

wherein M is a metal atom (including semimetal atom), and A is a chalcogen atom selected from C, S, Se, and Te, nitrogen atom, or carbon atom.

The metal atom (including semimetal atom) represented by M should be an atom which is not limited for its oxidation number in the compound or the composition, and exemplary such atoms include Si, Ti, Al, Zn, Zr.

In order to facilitate smooth chemisorption reaction of the silane coupling agent, the chemical bond moiety may preferably comprise a metal atom and a chalcogen atom such as oxygen. Exemplary such chemical bonds include Si—C bond, Ti—O bond, Al—C bond, Zn—C bond, Zr—O bond, and Zn—S bond. Among these, use of a composition containing Si—O bond is most preferable in view of the wide choice of available materials which can be adopted in the practical use. In such a case, the composition containing Si—O bond may constitute the supporting substrate or the light-transmitting layer itself, or alternatively, such composition may be covered over the surface of the substrate or the light-transmitting layer which is free from such Si—O bond. In order to reliably attain sufficient scratch resistance in these embodiments, the surface layer region of the underlying layer with a thickness of at least 100 nm, and more preferably at least 500 nm from the surface may preferably comprises a compound having Si—O bond. In either embodiments, incorporation of the compound having Si—O bond in the surface region of the underlying layer to be covered with the silane coupling agent will realize a remarkable improvement in the adhesion of the coupling agent to the surface of the underlying layer.

The most typical composition containing the compound having Si—O bond is glass, and in the use of the glass, the entire substrate may be constituted from the glass. Alternatively, a thin film containing $SiO_2$ as its main component may be formed on a resin by means of sputtering or the like. Further possible embodiments are use of a resin such as polydimethylsiloxane which contains siloxane bond in its molecular chain, and employment of a process wherein a coupling agent such as an alkoxysilane is coated on a resin. In a still further embodiment, a thermoplastic resin such as polycarbonate or polymethyl methacrylate or an active energy beam-curable resin having admixed therein silica particles may be used, and when a composition having the silica particles dispersed is used for the light-transmitting layer, the silica particles may preferably have an average particle diameter of up to 500 nm, and more preferably, up to 100 nm. When the particle diameter is in excess of 500 nm, the diameter will be very close to or in excess of the wavelength of the recording/reading beam most widely used in an optical information medium, and adverse effects are induced in the recorded or output signal. Although no particular lower limit is set for the particle size, the lower limit is typically about 5 nm.

Among the compositions containing a compound having Si—O bond as described above, use of an active energy beam-curable resin admixed with silica particles for the underlying layer to be covered with the water- and oil-repellent silane coupling agent is most preferable in consideration of its use for the optical information medium. In such a case, a conventional resin such as polycarbonate or polymethyl methacrylate which has advantageous workability and cost effectiveness in the form of a substrate or a sheet may be overlaid with the underlying layer comprising a coating of an active energy beam-curable resin admixed with silica particles, and use of such product for the underlying layer is preferable. This facilitates convenient formation of the light-transmitting layer having extremely high durability.

The active energy beam-curable resin admixed with silica particles used may be a resin composition having silica particles simply dispersed therein. However, it is preferable that the silica particles (preferably having a particle size as described above) are chemically bonded to the polymer chain since fixture of the silica particles to the polymer chain by chemical bonding invites increase in the surface hardness of the cured film. The silica particles may be chemically bonded to the polymer chain after the curing, for example, by the method proposed in JP-A 100111/1997.

The active energy beam-curable resin admixed with the silica particles may typically comprise a UV-curable resin, and an exemplary UV-curable resin wherein the silica particles are fixedly bonded is the resin commercially available under the trade name of DeSolite Z7501 (manufactured by JSR Co., Ltd.).

The underlying layer as described above may be the light-transmitting layer, the supporting substrate, or other member constituting the optical information medium, or alternatively, the underlying layer may be a layer covering the member constituting the optical information medium. In either case, the underlying layer may have a thickness of about 0.1 $\mu$m to about 1.5 mm.

The content of the Si—O bond in the underlying layer is preferably at least 15%, and more preferably at least 20% in mass %. When the content is excessively low, the abrasion resistance of the underlying layer will not be sufficiently improved and the adhesion to the silane coupling agent will also be insufficient to detract from the merits of the present invention.

The active energy beam-curable resin admixed with the silica particles is typically in the form of a dilution with an organic solvent because of its production process and for the purpose of reliably attaining the product stability. Accordingly, when the underlying layer is formed by using such material, the organic solvent should be removed to a sufficient level before the irradiation of the active energy beam. Typically, the preferable content of the organic solvent in the underlying layer is preferably up to 5% (mass %).

The organic solvent may be removed by heating. However, when the underlying layer is formed by spin coating, the removal of the organic solvent may be accomplished simultaneously with the coating of the coating solution by spinning off the coating solution at a high speed for a relatively long period. Removal of the solvent simultaneously with the spin coating is preferable in view of improving the productivity. However, in view of improving the surface hardness and reliability of the underlying layer, removal of the solvent by such means as heat drying is preferable since the underlying layer can be provided with density gradient of the silica particles in the vertical direction of the layer by heat treating the coated film of the underlying layer before its curing.

When a thin film is formed by coating a liquid mixture or a solution of two or more components having relatively low mutual compatibility or affinity, it is known that each component generally undergoes self-assembly when the film is left at a high temperature for a prolonged period. Such tendency was also confirmed for the UV-curable resin admixed with the silica particles as described above in the investigation conducted by the inventors of the present invention, and to be more specific, the monomer and the like which are the organic components and the silica particle which is an inorganic component respectively exhibited tendency to undergo self-assembly when the resin was set at a relatively high temperature for a prolonged period before the UV irradiation. In the present invention, the underlying layer is typically formed on the surface of a resin material layer such as the light-transmitting layer and the supporting substrate, and by experiencing the setting, the organic components in the UV-curable resin tend to undergo self-assembly near the boundary with the light-transmitting layer or the supporting substrate formed from a resin exhibiting high affinity for the organic components, while the inorganic silica particles tend to undergo self assembly at the surface of the underlying layer. In other words, the silica particles are distributed with a density gradient in the vertical direction of the underlying layer, and the surface of the underlying layer exhibits an improved hardness compared to the case where no density gradient is formed. At the same time, the underlying layer exhibits an elastic modulus which gradually decreases from the surface of the underlying layer to the side of the light-transmitting layer or the supporting substrate. Accordingly, drastic change in the elastic modulus, thermal expansion coefficient, and other physical properties at the boundary between the light-transmitting layer or the supporting substrate and the underlying layer is mitigated compared to the case wherein no density gradient is present. As a consequence, distortion of the disk which has been intentionally or unintentionally applied to the disk as well as internal stress resulting from rapid change in the exterior temperature are gradually alleviated near the boundary between the light-transmitting layer or the supporting substrate and the underlying layer. Therefore, occurrence of cracks on the surface of the underlying layer induced by such mechanical or thermal impact is highly suppressed.

It should be noted that the process which may be employed for creating the density gradient of the silica particles in the underlying layer having the silica particles dispersed therein is not limited to the heat drying as described above, and any process may be adopted as long as the desired density gradient can be realized. It should also be noted that density gradient can also be created for a resin material free from the non-reactive organic solvent by such means as heat treatment before the curing.

For the purpose of confirming whether the density gradient of the silica particles has been really created in the resulting underlying layer, various analysis known in the art may be employed including X-ray photoelectron spectroscopy (XPS) which is a common method used in the surface elementary analysis. To find out the detailed distribution of the silica density in vertical direction of the underlying layer, the surface analysis is preferably employed in combination with etching by ion beam sputtering. Alternatively, a cross section of the underlying layer may prepared, and the exposed section may be observed by various elementary analysis methods. In most cases, however, confirmation of the difference in the surface silica density in relative comparison between the underlying layers formed under different heat drying and other conditions is sufficient, and etching in the vertical direction and the observation of the cross section are usually not required.

The desirable range of the density gradient of the silica particles can not be defined to a particular range since various factors including content of the silica particles in the resin, thickness of the as-deposited underlying layer, physical properties of the material used in the light-transmitting layer or the supporting substrate on which the underlying layer is formed, and surface hardness and reliability required are inseparably intertwined. Therefore, the optimal silica density gradient should be empirically determined by trial and error, for example, by altering the heat drying condition in the course of the film formation.

The presence of the silica particle density gradient is not necessarily a prerequisite in the formation of the underlying layer using the UV-curable resin having the silica particles admixed therein. As described above, provision of the density gradient may be adequately determined by taking the balance between the improvement of the hardness and reliability realized by the development of the density gradient and the productivity into consideration.

The present invention has been described by featuring silica which is the most preferred among the compounds having the chemical bond represented by formula (2). However, what has been described in the foregoing applies to all of the metal chalcogenides which are preferable for use in the present invention, and to the metal nitrides (e.g. silicon nitride) and the metal carbides (e.g. silicon carbide and calcium carbide) which are also the compounds having the chemical bond represented by formula (2).

The underlying layer as described above may also comprise two or more layers in order to improve the adhesion between the water- and oil-repellent silane coupling agent film and the underlying layer or to further improve scratch resistance of the surface of the light-transmitting layer. To be more specific, a thin film may be formed as the surface layer by vapor deposition such as sputtering, evaporation, ion plating, or CVD on the surface of the light transmitting layer and in contact with the silane coupling agent, and an inner layer containing a metal compound and having a composition different from that of the thin layer may be formed in contact with the thin layer and on the side nearer to the recording layer so that the underlying layer is constituted from the surface layer and the inner layer.

In a typical embodiment, the layer comprising an active energy beam-curable resin containing silica particles as described above may be coated as the inner layer on the surface of the light-transmitting layer or the recording layer, and after an optional surface modification treatment, the thin layer may be formed as the surface layer on the inner layer by sputtering using a $SiO_2$ target. The water- and oil-repellent silane coupling agent film may be thereafter formed on the surface layer.

The surface layer may be formed to a thickness of up to 1 $\mu$m, and preferably to a thickness in the range of 10 nm to 1 $\mu$m, and more preferably to 20 nm to 500 nm. When the thickness is in excess of 1 $\mu$m, the surface layer or the inner layer will suffer from the risk of crack development. When the surface layer is too thin, no substantial improvement in the scratch resistance will be realized over the embodiment wherein no surface layer is formed.

Exemplary materials favorably used in the formation of the surface layer include silicon oxide, titanium oxide, aluminum oxide, zirconium oxide, silicon nitride, titanium nitride, silicon carbide, and calcium carbide.

On the other hand, the inner layer may comprise an active energy beam-curable resin containing silica particles as described above, and alternatively, a composition containing a hydrolyzable metal compound. Such film may be formed, for example, by sol-gel process from a solution containing a hydrolyzate prepared by adding an inorganic acid such as hydrochloric acid or sulfuric acid or an organic acid such as acetic acid to an organosilicon compound such as a tetraalkoxysilane, and a curing catalyst such as acetyl acetonate complex or perchlorate.

The inner layer may also comprise a material containing a polysilazane or a silica component derived from a polysilazane. A polysilazane is generally known to be hydrolyzed by the moisture in the air when it is heated in air to form high purity silica. The compounds generally referred as "polysilazane" in the present invention are compounds of low molecular weight to high molecular weight having Si—N—Si bond. Exemplary such polysilazanes include cyclic inorganic polysilazanes having a structure represented by formula $(—Si(H)_2—NH—)_n$, wherein n is 100 to 50000; a chain inorganic polysilazanes and mixtures thereof; and polyorganohydrosilazanes wherein the hydrogen atoms binding to the silicon atoms of an inorganic polysilazane are partly or entirely replaced with an organic group. The inner layer may also comprise a polysiloxazane wherein oxygen has been incorporated in the molecule, a polymetallosilazane prepared by reacting with a metal alkoxide; or a polyborosilazane prepared by reacting with an organic boron compound.

In contrast to the surface layer, the inner layer may preferably contain an organic component in addition to the inorganic component. With regard to the composition as described above, the composition may contain an active energy beam-curable resin containing silica particles, and alternatively, a silicon compound formed from an alkoxysilane or polysilazane by using a material wherein the silicon atom has an organic substituent such as a long chain hydrocarbon group for the material to be cured.

By using such composition including both inorganic and organic components for the inner layer, not only the strong adhesion between the inner layer and the surface layer, but also an equivalently improved adhesion between the inner layer and the light-transmitting resin layer are realized. It should be noted that, in the present invention, the "composition including both inorganic and organic components" may be a mixture of the inorganic and the organic compounds, or a substance wherein an inorganic bond such as Si—O—Si and an organic substituent such as Si—R (wherein R is a hydrocarbon group or the like) are present in a polymeric compound. Both are within the scope of the present invention.

When a resin light-transmitting layer is disposed between the inner layer and the recording layer, the constitution of the medium will be such that an intermediate layer is formed between the light-transmitting layer and the surface layer, and the high risk of crack development found in the case when a thin layer solely consisting an inorganic material is formed on the resin light-transmitting layer can be suppressed. Such effect is attained since the drastic difference in elastic modulus and thermal expansion coefficient at the boundary between the resin light-transmitting layer and the inorganic thin layer is moderated by the material inserted between these layers, namely, by the material containing both the organic and the inorganic content.

The inner layer is preferably deposited to a thickness more than that of the surface layer. To be more specific, the inner layer may preferably have a thickness which is about 1.5 to 50 folds thicker than that of the surface layer, and preferably, to a thickness of 0.1 µm or more, and more preferably to a thickness of 0.2 µm or more. There is no particular upper limit for the thickness of the inner layer. The upper limit, however, is generally around 30 µm.

JP-A 203726/1999 discloses a method wherein surface scratch resistance is improved by providing two or more thin layers comprising an inorganic compound on a resin light-transmitting layer. In the method proposed in this patent application, two or more inorganic material layers of SiN or SiO are formed on the surface of the resin light-transmitting layer comprising a UV-curable resin by vapor deposition such as sputtering to a thickness of approximately several hundred nm. There is described in JP-A 203726/1999 that a surface exhibiting improved scratch resistance is obtained by such constitution.

However, it is quite difficult to obtain a scratch resistance of practically acceptable level by forming an inorganic film of such thickness. As a matter of fact, the evaluation conducted in the Example of JP-A 203726/1999 is the evaluation of microhardness which is unlikely to reflect the hardness of the underlying resin layer, and no evaluation under the conditions resembling the environment of practical use, for example, evaluation of abrasion resistance or steel wool test, are conducted. In addition, in the method of JP-A 203726/1999, a layer solely comprising an inorganic compound is formed directly on the layer of the UV curable resin which is an organic compound, and it can not be assumed that a sufficient adhesion is realized between the inorganic material layer and the UV-curable resin layer. Accordingly, peeling of the inorganic layer and cracks are expected to occur when such optical disk is left under high temperature conditions.

It should be noted that, when the underlying layer is constituted in the present invention from the two or more layers as described above, the underlying layer may also be the light-transmitting layer, the supporting substrate, or other member constituting the optical information medium, or alternatively, the underlying layer may be a layer covering the member constituting the optical information medium.

The embodiment of the present invention wherein the underlying layer comprises two or more layers has been described in the foregoing for the case wherein a film of water- and oil-repellent silane coupling agent is formed on the underlying layer. However, when the primary object is improvement of scratch resistance of the surface of the optical information medium, the medium may be provided solely with the inner layer and the surface layer without combining these layers with the silane coupling agent film.

In the embodiment wherein no silane coupling agent film is provided on the surface of the light-transmitting layer, the surface layer maybe constituted from a thin layer of hard carbon (Diamond Like Carbon, DLC) since there is no need to take the chemical reaction between the coupling agent and the surface layer into consideration. The DLC thin layer can be formed by techniques commonly employed in the art, for example, by sputtering or CVD to a thickness equivalent to the surface layer as described above. The DLC thin film may preferably have a Vickers hardness Hv of at least 13.

In addition, when water and oil repellency is not particularly required for the surface of the light-transmitting layer and an extreme improvement in the scratch resistance of the light-transmitting layer is not demanded, an embodiment wherein the surface of the light-transmitting layer is formed from a single layer of metal (including a semimetal) compound is also effective. A necessary and sufficient scratch resistance of practically acceptable level is quite often realized by such single layer constitution in the case of some read only-type mediums although the situation may greatly vary depending on the intended use and recording density of the particular optical information medium.

In such embodiment, the medium is most preferably provided with a light-transmitting layer which contains an active energy beam-curable resin admixed with particles of a metal compound at least in some parts thereof (and preferably, in its surface layer region). The metal compound is selected from the metal chalcogenide, metal nitride, and metal carbides as described above, and preferably, the metal compound is particles of a metal chalcogenide (most preferably silica particles). The term "single layer constitution" is used in this context to describe the situation that the metal compound-containing layer comprises one single layer, and not the situation that the entire light transmitting layer comprises one single layer. For example, an embodiment wherein the surface of the resin supporting substrate is covered with the layer of an active energy beam-curable resin containing silica particles is within the scope of such constitution, and such embodiment is quite preferable. Provision of the silica particle-containing layer separately from the resin supporting substrate may be even more advantageous compared to the use of a resin supporting substrate having the particles kneaded therein since such separate provision is free from the problems associated with the particle-containing supporting substrate, for example, the problems of increased thickness of the resin supporting substrate and the resulting loss of design choice in the thickness, and complicated production steps due to the necessity of the particle incorporation which avoids use of conventional resin molding processes.

It is typical that each of the surface layer and the inner layer are formed from one single layer. These layers, however, may be formed from two or more layers if necessary, and in such a case, the total thickness of these layers should be controlled to fall within the thickness range as described above.

In the present invention, the water- and oil-repellent silane coupling agent employed in the embodiment wherein the water- and oil-repellent silane coupling agent is used in combination with the underlying layer is the one represented by formula (1):

$$R_1—Si(X)(Y)(Z) \qquad (1)$$

wherein $R_1$ is substituent having water- or oil-repellency; X, Y and Z are respectively a monovalent group; and wherein at least one of X, Y and Z is a substituent which is capable of forming Si—O—Si bond by polycondensation with silanol (Si—OH) group. Such substituent which is capable of undergoing polycondensation with the silanol group may be a member selected from a halogen, —OH, —OR$_2$ (wherein R$_2$ is an alkyl group), —OC(O)CH$_3$, —NH$_2$ and —N=C=O.

In the water- and oil-repellent silane coupling agent represented by formula (1), the substituent having water- or oil-repellency represented by R$_1$ is a substituent whose incorporation in the compound results in the development of water repellency or oil-repellency of the compound. The water repellency and the oil-repellency may be directly represented by critical surface tension ($\gamma_c$/mNm$^{-1}$) which is an index for the surface free energy of the substance. The critical surface tension can be calculated from the measurements of the contact angle, and to be more specific, by measuring several saturated hydrocarbon liquids (surface tension: $\gamma_1$/mNm$^{-1}$) each having known surface tension for their contact angle ($\theta$/rad) on a smooth surface of the substance; and plotting cos $\theta$ in relation to $\gamma_1$ and extrapolating to cos $\theta$=1 to find the corresponding value $\gamma_c$. When a particular substance should repel a liquid, the $\gamma_c$ of the substance should be lower than the surface tension $\gamma_1$ of the liquid. For example, a substance having the surface composition comprising methylene chain (e.g. —CH$_2$—CH$_2$—) has a $\gamma_c$ of 31 mNm$^{-1}$, and this substance repels water whose $\gamma_1$ at a temperature of 20° C. is 73 mNm$^{-1}$ while it is fully wetted by n-hexadecane whose $\gamma_1$ is 28 mNm$^{-1}$ and the contact angle becomes 0 degrees. It is an object of the present invention to provide a medium with water- and oil-repellency which is higher than that of conventional universal resins such as polycarbonate and polymethyl methacrylate, and therefore, the critical surface tension $\gamma_c$ is preferably up to 30 mNm$^{-1}$. Furthermore, the $\gamma_c$ is preferably up to 25 mNm$^{-1}$ to enable development of the smudge-proof performance of practically acceptable level. Although no particular lower limit is set for the $\gamma_c$, the lower limit of the $\gamma_c$ is typically 6 mNm$^{-1}$.

The water- and oil-repellent group represented by R$_1$ may be preferably a group containing a fluorohydrocarbon group, and exemplary fluorohydrocarbon groups include a fluoroalkyl group and a fluoroalkyl group containing a fluoroalkyleneoxy group. The fluorohydrocarbon group preferably contains 1 to 1000 carbon atoms in total, and the fluorohydrocarbon group may be either a straight chain group or a branched group, the straight chain group being preferable.

Exemplary fluorohydrocarbon groups include fluorinated polyolefin segments represented by the following formulae (3) and (4) and the fluorinated polyether segments represented by the following formulae (5) and (6).

  (3)

  (4)

  (5)

  (6)

x and y in the formulae (3) to (6) are respectively a positive integer, and preferably a positive integer in the range of 0 to 200 since no substantial improvement in the water- and oil-repellent properties are realized by increasing the x and y beyond 200 while film formation is impaired by the decrease of solubility in various solvents.

These groups exhibit excellent water- and oil-repellency, and among these, the groups having a long carbon chain with no branched structure exhibit more preferable water- and oil-repellency.

On the other hand, the reactive groups in the silane coupling agent, namely, X, Y, and Z in Si (X) (Y) (Z) of formula (1) may be a substituent which is capable of forming Si—O—Si bond by polycondensation with silanol group, and such group may be selected from a halogen, —OH (hydroxy), —OR$_2$ (alkoxy), —OC(O)CH$_3$ (acetoxy), —NH$_2$ (amino), and —N=C=O (isocyanate). The halogen is preferably Cl or Br. In the —OR$_2$, R$_2$ is an alkyl group containing 1 to 5 carbon atoms in total which may be either a straight chain group or a branched group. R$_2$ may have a substituent which does not inhibit the chemisorption reaction while a substituent such as a halogen is not preferable for the same reason. Examples of the —OR$_2$ include methoxy, ethoxy, propoxy, isopropoxy, butoxy, isobutoxy, and t-butoxy.

X, Y, and Z may be the same or different, and when different, X, Y, and Z may be different halogens or different alkoxy groups, or alternatively, X, Y, and Z may be a combination two or three types of halogen, hydroxy, alkoxy, acetoxy, amino, and isocyanate. In addition, it is not necessary that all of the X, Y, and Z are reactive substituents as long as at least one of the X, Y, and Z is a group generated by hydrolysis of, for example, the halogen, alkoxy, hydroxy, acetoxy, amino, or isocyanate as described above. However, it is preferable that all of the X, Y, and Z are the reactive groups as described above in order to form a strong siloxane bond network. When X, Y, and Z are a monovalent group which is not the reactive group as described above, such monovalent group may be hydrogen atom, an alkyl group containing 1 to 5 carbon atoms, or the like.

When X, Y, and Z are a halogen, an alkoxy group, an acetoxy group or an amino group, it is generally preferable that hydrolysis is preliminarily promoted to some extent for conversion into silanol group. On the other hand, such preliminary hydrolysis is unnecessary when X, Y, and Z are silyl isocyanate. The silanol group and the silyl isocyanate group smoothly undergo the coupling reaction at room temperature, and no special heating is required for the promotion of the reaction. Therefore, a silane isocyanate coupling agent can be used when there is some risk of deterioration of the resin or the recording layer by heat.

An example of such silane coupling agents is a product commercially available under the trade name of DSX (manufactured by Daikin Industries, Ltd.).

The method for coating the silane coupling agent as described above may be adequately selected from conventional methods used in thin film formation. Exemplary such coating methods include spin coating, dip coating, and spray coating, and the silane coupling agent may be coated by any method known in the art. In addition, the silane coupling agent used for the film formation may be diluted with a solvent before its use if such dilution is necessary.

In addition, in order to improve the adhesion between the underlying layer containing the compound having the Si—O bond or the like as described above and the silane coupling agent, hydrophilicity of the surface of the underlying layer in the disk or the like may be increased by a treating the surface with a high energy beam, for example, by treating with ultraviolet ray, plasma, electron beam, and corona discharge. Such surface activation using the high energy beam treatment does not achieve sufficient effects when used for a surface comprising an organic-based material. However, when such treatment is applied to the underlying layer of the composition containing a compound having the Si—O bond or the like as described above, such treatment is quite effective since Si—O—Si bond and the like will be cleaved to produce a reactive group such as Si—OH.

Such film of the silane coupling agent has a thickness corresponding the thickness of a monomolecular film or a ultrathin film resembling a monomolecular film, and to be more specific, a thickness of about 1 to about 20 nm.

EXAMPLES

Next, the present invention is described in further detail by referring to Examples which by no means limit the scope of the present invention. Comparative Examples are also described.

Example 1

Determination of Optimal Conditions for Heat Drying the Coating Formed from a Silica Particle-Admixed UV-Curable Resin Diluted with an Organic Solvent Optimal heat drying conditions were investigated for a film formed by using DeSolite Z7503 (manufactured by JSR Co., Ltd., silica particle-fixed type) as the silica particle-admixed UV-curable resin. This silica particle-admixed UV-curable resin contains propylene glycol monomethyl-ether acetate (PGMEA) and methyl ethyl ketone (MEK) at a volume ratio of 9:1 as dilution solvents. This product was used as the coating solution with no further dilution. The solid content, namely, the concentration of the involatile components other than the dilution solvent in the total coating solution was 60% (mass %). The silica particles in the resin had an average particle size of about 10 nm, and the content of the silica particles in the resin was 38% (mass %).

A polycarbonate substrate having a diameter of 120 mm and a thickness of 0.6 mm was spin coated with a UV-curable resin admixed with silica particles (DeSolite Z7503 manufactured by JSR Co., Ltd.) by spinning the resin off the disk at 6000 rpm for 2 seconds. The coated film was heat-dried in air at 60° C. for 3 minutes, and cured by UV irradiation (high pressure mercury lamp, 550 mJ/cm$^2$). The cured film had a thickness of about 3.4 μm.

Several samples were prepared by repeating the procedure as described above by using different drying temperature and the drying time. In all samples, the cured film had substantially same thickness of about 3.4 μm.

On the other hand, samples not experiencing the heat drying step were prepared by changing the spin coating conditions from "6000 rpm for 2 seconds" as described above to 6000 rpm for 60 seconds, and UV curing the coating immediately after the spin coating with no step of heat drying. Samples were also prepared in similar manner by using different spin-off time in the spin coating. It should be noted that the film prepared by adopting different spin-off time had the substantially same thickness of about 3.4 μm as long as the spin-off time was 2 seconds or more.

Several samples were selected from the samples which had been produced under different film-forming conditions, and these samples were evaluated by gas chromatography for the quantity of solvent remaining in the film, and by X-ray fluorescence analysis for the silicon atom density on the film surface. The results of the measurement are shown in Tables 1 and 2.

TABLE 1

| Spin coating conditions Rotation speed/time | Heat drying conditions Temp./time | Amount of residual PGMEA (mass %) | Amount of residual MEK (mass %) | Total amount of residual solvents (mass %) |
|---|---|---|---|---|
| 6000 rpm/2 sec. | 60° C./3 min. | 2.43% | 0.55% | 2.98% |
| 6000 rpm/10 sec. | None | 2.93% | 0.78% | 3.71% |
| 6000 rpm/30 sec. | None | 1.58% | 0.66% | 2.24% |
| 6000 rpm/60 sec. | None | 0.50% | 0.64% | 1.14% |

TABLE 2

| Spin coating conditions Rotation speed/time | Heat drying conditions Temp./time | Si intensity (kcps) |
|---|---|---|
| 6000 rpm/2 sec. | Room temp./1 min. | 198.70 |
| | Room temp./3 min. | 197.45 |
| | 40° C./1 min. | 197.18 |
| | 40° C./3 min. | 198.22 |
| | 60° C./1 min. | 198.10 |
| | 60° C./3 min. | 201.72 |
| | 80° C./1 min. | 200.63 |
| | 80° C./3 min. | 204.23 |
| 6000 rpm/60 sec. | None | 193.59 |

Next, main samples of the samples as described above were evaluated by Taber abrasion test under the following conditions. The abrasion wheel used was CS-10F, and the haze value (ΔHaze (%)) after abrasion of 500 rotations under the load of 4.9 N was measured. The haze value was measured by a fully automatic haze meter TC-HIIIDPK manufactured by Tokyo Denshoku Gijutsu Center. Several samples of the samples as described above were evaluated for their reliability by thermal shock test under the test conditions of: temperature of the high-temperature room/time of 70° C./30 minutes, and temperature of the low-temperature room/time of −20° C./30 minutes. Occurrence of cracks in the film was visually confirmed after repeating 100 quenching cycles as described above. The results are shown in Table 3.

TABLE 3

| Spin coating conditions Rotation speed/time | Heat drying conditions Temp./time | ΔHaze (%) after abrasion test | Crack after thermal shock test |
|---|---|---|---|
| 6000 rpm/2 sec. | Room temp./1 min. | — | Yes |
| | Room temp./3 min. | 6.9 | Yes |
| | 40° C./1 min. | — | Yes |
| | 40° C./3 min. | — | Yes |
| | 60° C./1 min. | — | Yes |
| | 60° C./3 min | 5.7 | No |
| | 80° C./1 min. | 5.8 | No |
| | 80° C./3 min. | 6.2 | No |
| 6000 rpm/60 sec. | None | 13.0 | Yes |

The results indicate that the abrasion resistance of the underlying layer reached sufficient level by the drying at room temperature of about 3 minutes. However, reliability of the cured film was still insufficient under such drying conditions, and the drying temperature and time of 60° C. for at least 3 minutes are required to provide sufficient reliability with the film, and in particular, sufficient crack resistance with the film. On the other hand, the results shown in Table 1 indicate that the amount of residual solvent in the film is smaller even if no heat drying was conducted when the spin coating was conducted by spinning off at 6000 rpm for at least 30 seconds compared to the case wherein the heat drying was conducted at 60° C. for 3 minutes. This confirms that the insufficient of the abrasion resistance and the reliability after drying under the conditions milder than the drying at 60° C. for 3 minutes is not due to the remaining of the organic solvent in the film but because of the insufficient density gradient of the silica particles in the film.

As a matter of fact, Table 2 shows that a significantly higher Si intensity is detected when the heat drying is conducted under the conditions severer than 60° C. for 3 minutes compared to other samples. This strongly indicates that the density gradient of the silica particles is caused by self-assembly of the silica to the film surface, and the internal stress created by the repeated thermal shock cycles is relieved by such density gradient. Accordingly, in the following part of the examples, the optimal heat drying condition in forming the underlying layer from the UV-curable resin admixed with silica particles was assumed to be drying at 60° C. for 3 minutes.

Evaluation of the Underlying Layer

A polycarbonate substrate having a diameter of 120 mm and a thickness of 0.6 mm was spin coated with a UV-curable resin admixed with silica particles (DeSolite Z7503 manufactured by JSR Co., Ltd., silica particle-fixed type). The coated film was heated in air at 60° C. for 3 minutes for solvent removal, and cured by UV irradiation (high pressure mercury lamp, 550 mJ/cm$^2$). The cured film had a thickness of about 3.4 μm (Substrate 1).

Next, thus treated surface was evaluated for its abrasion resistance by Taber abrasion test using the same abrasion wheel and the load conditions as described above. The haze value (ΔHaze) after 100 abrasion rotations was measured to be 2.0%. The substrate was placed on the abrasion tester again to continue the evaluation. The haze value (ΔHaze) after 500 abrasion rotations in total was measured to be 5.3%. These results demonstrate the extremely high scratch resistance of the surface. The treated surface was also evaluated for contact angle with water at 20° C. and 60% RH using a contact angle meter (CA-D manufactured by Kyowa Interface Science Co., Ltd.). The contact angle was 72.5 degrees.

Comparative Example 1

A polycarbonate substrate having a diameter of 120 mm and a thickness of 0.6 mm was spin coated with a UV-curable acrylic resin (HOD-3091 manufactured by Nippon Kayaku Co., Ltd.) by spin coating, and the coated film was cured by UV irradiation (high pressure mercury lamp, 550 mJ/cm$^2$). The cured film had a thickness of about 3.3 μm (Substrate 2).

The substrate was evaluated by Taber abrasion test by repeating the procedure of Example 1. The haze values after 100 abrasion rotations and 500 abrasion rotations were 14.0% and 36.2%, respectively, and this scratch resistance was markedly inferior to that of Examples 1. The treated surface was also evaluated for its contact angle with water by repeating the procedure of Example 1, and the contact angle with water was 97.7 degrees. On the other hand, the contact angle with n-octane of the treated surface was measured to be 0 degrees. Accordingly, the hard coat treatment using the conventional UV-curable resin was capable of imparting the surface with a certain degree of water repellency while it failed to impart the oil repellency, and it was then estimated that such treatment is incapable of imparting the surface with resistance to organic contaminants such as fingerprint.

Example 2

The surface of the substrate 1 which had been subjected to the hard coat treatment was spin coated with 0.1% (mass %) perfluorohexane solution of DSX (manufactured by Daikin Industries, Ltd.) which is a water- and oil-repellent silane coupling agent within the scope of formula (1), and the sample was heated in air at 60° C. for 10 hours for chemisorption (Substrate 3). The film of the silane coupling agent had a thickness of about 10 nm.

The thus treated substrate 3 was measured for its contact angle with water by repeating the procedure of Example 1. The contact angle with water was 114.0 degrees indicating a remarkable improvement in the water repellency compared to the substrate 1 before the treatment using the coupling agent.

The surface of the substrate was also measured for its contact angle with n-octane by repeating the procedure as described above, and the contact angle with n-octane was 47.2 while the contact angle with n-hexadecane was measured to be 63.8 degrees. The treated surface of this Example thereby confirmed to exhibit not only the water repellency but also oil repellency, and to be highly resistant to organic contaminants such as fingerprint. The substrate surface had a critical surface tension $\gamma_c$ of 12 mNm$^-$.

Next, the treated surface was evaluated for contact angle with water after rubbing the surface with Bemcot Lint Free CT-8 (manufactured by Asahi Chemical Industry Co., Ltd.) under the load of 4.9N for 300 reciprocations. The contact angle with water measured was 112.0 degrees. The critical surface tension $\gamma_c$ of the substrate surface was substantially equivalent to the value before the rubbing. It was then confirmed that the water repellency of the surface was maintained at a high level, and that the water- and oil-repellent coupling agent had high adhesion to the surface of the underlying layer.

Comparative Example 2

The surface of the hard coat-treated substrate 2 was spin coated with 0.1% (mass %) perfluorohexane solution of DSX (manufactured by Daikin Industries, Ltd.) which is a water- and oil-repellent silane coupling agent within the scope of formula (1), and the sample was heat cured in air at 60° C. for 10 hours (Substrate 4). The film of the silane coupling agent had a thickness of about 10 nm.

The treated surface was evaluated for contact angle with water by repeating the procedure of Example 1, and the contact angle with water was measured to be 111.2 degrees.

Next, the treated surface was evaluated for contact angle with water by repeating the procedure of Example 1 after rubbing the surface with Bemcot Lint Free CT-8 (manufactured by Asahi Chemical Industry Co., Ltd.) under the load of 4.9N for 300 reciprocations. The contact angle measured was as low as 100.7 degrees which is substantially equivalent to the contact angle with water of the substrate 2 before the coating of the silane coupling agent. It was then confirmed that the silane coupling agent is little left on the surface, and the adhesion and durability were inferior to those of Example 1. In this case, the substrate surface had a critical surface tension $\gamma_c$ of 35 mNm$^{-1}$, which was substantially equivalent to that of the UV curable acryl resin surface of the substrate 2 (Comparative Example 1).

As described above, in the case of the substrate treated in accordance with the present invention, the surface of the light-transmitting layer exhibits excellent scratch resistance, and when a film layer of a water- and oil-repellent coupling agent is formed on its surface, adhesion of this film to the light-transmitting layer is quite strong. Therefore, the favorable properties of the silane coupling agent film is maintained at the initial favorable level. In addition, even when the silane coupling agent film was formed on the surface, the film formed is either a monomolecular layer or a thin film resembling the monomolecular layer, and the favorable durability of the hard coat-treated surface is fully reflected. As a consequence, the resulting product has excellent properties including the combination of the smudge-proof properties of the coupling agent film and the abrasion resistance of the hard coat-treated surface.

The contact angle of the substrates 1 to 4 produced in Examples 1 and 2 and Comparative Examples 1 and 2 are shown in Table 4.

TABLE 4

Contact angle of the treated surface

| | Water | | | |
|---|---|---|---|---|
| Substrate | Initial | After surface abrasion | n-octane Initial | n-hexane Initial |
| Example 1 | 72.5 deg. | — | — | — |
| Comparative Example 1 | 97.7 deg. | — | 0 deg | — |
| Example 2 | 114.0 deg. | 112.0 deg. | 47.2 deg. | 63.8 deg. |
| Comparative Example 2 | 111.2 deg. | 100.7 deg. | — | — |

Example 3

A surface layer of 100 nm thick was formed on the Substrate 1 of Example 1 by sputtering using a $SiO_2$ target after treating the surface of the inner layer for surface modification by sputter etching to ensure good adhesion between the inner layer and the surface layer at their boundary (Substrate 11).

The substrate was then evaluated for its abrasion resistance by Taber abrasion test by repeating the procedure of Example 1. The haze values (ΔHaze, %) after 100 and 500 abrasion rotations were 0.6% and 2.2%, respectively, confirming the markedly improved scratch resistance of this substrate even when compared to Example 1.

Comparative Example 3

A surface layer of 100 nm thick was formed on the Substrate 2 of Comparative Example 1 by sputtering using a $SiO_2$ target after treating the surface of the inner layer (Substrate 12).

The substrate was then evaluated for its abrasion resistance by Taber abrasion test by repeating the procedure of Example 1. The haze values (ΔHaze, %) after 100 and 500 abrasion rotations were 9.3% and 32.4%, respectively, indicating no substantial improvement over Comparative Example 1 which exhibited inferior scratch resistance compared to that of the Examples 1 and 3.

The results of Examples 1 and 3 and Comparative Examples 1 and 3 demonstrate the merits of the present invention realized by the provision of the surface $SiO_2$ layer formed by sputtering.

The haze values (ΔHaze, %) of Substrates 1, 2, 11 and 12 of Examples 1 and 3 and Comparative Examples 1 and 3 after the abrasion test are shown in Table 5.

TABLE 5

| | ΔHaze (%) in abrasion test | |
|---|---|---|
| Substrate | after 100 rotations | after 500 rotations |
| Example 1 | 2.0 | 5.3 |
| Example 3 | 0.6 | 2.2 |
| Comparative Example 1 | 14.0 | 36.2 |
| Comparative Example 3 | 9.3 | 32.4 |

Example 4

In a DVD-RAM (recording capacity, 2.6 GByte/face) having a polycarbonate substrate which is not covered with a protective coating on side of the light incidence, the surface of the substrate on the side of the light incidence was spin coated with a UV-curable resin admixed with silica particles (DeSolite Z7503 manufactured by JSR Co., Ltd.). The coated film was heated in air at 60° C. for 3 minutes for the solvent removal, and cured by UV irradiation (high pressure mercury lamp, 550 mJ/cm$^2$). The cured film had a thickness of about 3.4 µm. The thus treated surface was spin coated with 0.1% (mass %) perfluorohexane solution of DSX (manufactured by Daikin Industries, Ltd.) which is a water- and oil-repellent silane coupling agent within the scope of formula (1), and the sample was heated in atmosphere at 60° C. for 10 hours for chemisorption (Medium 1). The film of the silane coupling agent had a thickness of about 10 nm.

Next, the disk was recorded in the area of from 39.5 to 57.5 mm in diameter with a random signal to measure the bit error rate (BER) in the recording. Average value of the bit error rate in the entire recording area was $4.4 \times 10^{-5}$. Fingerprints were then attached on the entire recording area of the disk, and attempts were made to read the disk. The disk was unreadable. The disk was then wiped in radial direction from its inner periphery to its outer periphery with Bemcot Lint Free CT-8 (manufactured by Asahi Chemical Industry Co., Ltd.) at a pressure of 100±10 g/cm$^2$ for 20 times to thereby wipe off the fingerprints on the disk. After wiping off the fingerprints, the disk was overwritten with a random signal and read. The average value of BER was $2.2 \times 10^{-4}$, and reading at an error rate similar to that of the initial state was possible. It was thus confirmed that the resistance to organic contaminants can be markedly increased by treating the disk surface with a water- and oil-repellent coupling agent. The results are shown in FIG. 3. The treated surface also exhibited excellent scratch resistance. It should be noted that the recording/reading beam was irradiated from the side of the silane coupling agent film formed on the substrate with the intervening resin layer.

Comparative Example 4

In a DVD-RAM (recording capacity, 2.6 GByte/face) having a polycarbonate substrate which is not covered with a protective coating on side of the light incidence, the surface of the substrate on the side of the light incidence was spin coated with a UV-curable acrylic resin (HOD-3091 manufactured by Nippon Kayaku Co., Ltd.), and the coated film was cured by UV irradiation (high pressure mercury lamp, 550 mJ/cm$^2$). The cured film had a thickness of about 3.3 µm (Medium 2).

Next, the disk was recorded in the area of from 39.5 to 57.5 mm in diameter with a random signal to measure the bit error rate (BER) in the recording. Average value of the bit error rate was $2.2 \times 10^{-5}$. Fingerprints were then attached on the entire recording area of the disk, and attempts were made to read the disk. The disk was unreadable as in the case of the medium 1. The disk was then wiped in radial direction from its inner periphery to its outer periphery with Bemcot Lint Free CT-8 (manufactured by Asahi Chemical Industry Co., Ltd.) at a pressure of 100±10 g/cm$^2$ for 20 times to thereby wipe off the fingerprints on the disk. After wiping off the fingerprints, the disk was overwritten with a random signal and read. The average value of BER was $7.8 \times 10^{-3}$ indicating significant deterioration compared to the initial state. In other words, the fingerprints could not be completely removed in the case of the hard coat formed by using the conventional UV-curable resin, and the hard coat was not at all smudge proof. The results are also shown in FIG. 3. The treated surface also exhibited inferior scratch resistance compared to the medium 1. It should be noted that the recording/reading beam was irradiated from the side of the resin layer formed on the substrate.

Example 5

In Example 4, a film of DeSolite Z7503 (manufactured by JSR Co., Ltd.) was formed on the surface of the substrate of the DVD-RAM on the side of the light incidence. The cured film had a thickness of 3.4 μm. The surface was then treated for surface modification by repeating the procedure of Example 3, and a $SiO_2$ layer was formed to a thickness of 100 nm by sputtering. On the $SiO_2$ layer was formed a film of silane coupling agent to a thickness of about 10 nm by repeating the procedure of Example 4 (Medium 11). This disk exhibited smudge proof properties equivalent to those of Example 4, and the scratch resistance was further improved over that of Example 4 in correspondence with the results of Example 3.

Example 6

In a magneto-optical disk having no protective coating on the polycarbonate substrate and having a protective coating of a UV-cured acrylic resin as the outermost layer on the side of the recording layer, the substrate surface and the surface of the protective coating on the side of the recording layer were respectively formed with a layer of UV-curable resin admixed with the silica particles by repeating the procedure of Example 3, and then, a film of silane coupling agent (Medium 3).

The thus produced medium 3 was found to exhibit excellent abrasion resistance as well as excellent smudge proof properties.

When the recording and the reading of the disk was conducted by irradiating the disk from the side of the substrate and moving the magnetic head in contact with the silane coupling agent film formed on the side of the protective coating of the recording layer, it was found that the treated disk surface functions as a lubrication film in the moving of the magnetic head to result in good moving properties as well as excellent durability.

MERITS OF THE INVENTION

As described above, the present invention provides an optical information medium which has excellent scratch resistance. The present invention also enables sufficient smudge-proof properties (in particular, easy removal of the contaminant) to be retained for a prolonged period. Therefore, the optical information medium such as an optical disk does not suffer from serious contamination problem when it is used without being accommodated in a cartridge, shell, or caddy.

Japanese Patent Application Nos. 107681/2000, 309218/2000 and 068761/2001 are incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

What is claimed is:

1. A method for producing an optical information medium to be optically recorded-and/or read, wherein
   said medium comprises a coating on at least one surface of the medium of a film of a chemisorbed silane coupling agent containing a water- or oil-repellent substituent, said silane coupling agent being represented by the following formula (1):

$$R_1Si(X)(Y)(Z) \qquad (1)$$

wherein $R_1$ is the water- or oil-repellent substituent; X, Y and Z are independently a monovalent group; and at least one of X, Y and Z is a group which is capable of forming Si—O—Si bond by polycondensation with silanol group; and said medium has an underlying layer formed in contact with said silane coupling agent film, and at least the surface of said underlying layer comprises a compound having a chemical bond represented by the formula (2):

$$M—A \qquad (2)$$

wherein M is a metal atom (including a semimetal), and A is a chalcogen atom selected from O, S, Se, and Te, nitrogen atom, or carbon atom, wherein said underlying layer comprises an active energy beam-curable resin containing particles of a compound having a chemical bond represented by the formula (2), which comprises forming said underlying layer by coating a surface of the optical information medium with said active energy beam-curable resin containing said particles and heat drying.

2. A method for producing an optical information medium according to claim 1 wherein the surface of the underlying layer coated with said silane coupling agent comprises an active energy beam-curable resin containing metal (including semimetal) chalcogenide particles, and said metal chalcogenide particles having an average particle size of up to 500 nm.

3. A method for producing an optical information medium according to claim 1, wherein the substituent $R_1$ in formula (1) is a water- or oil-repellent fluorohydrocarbon substituent.

4. A method for producing an optical information medium according to claim 1, wherein at least one of X, Y and Z in formula (1) is selected from a halogen, —OH, —$OR_2$, wherein $R_2$ is an alkyl group, —OC(O)$CH_3$, —$NH_2$, and —N═C═O.

5. A method for producing an optical information medium according to claim 1, wherein said medium has a recording and/or reading layer, formed on a supporting substrate, and the recording and/or the reading is accomplished by irradiating a light beam from the side of the medium comprising said supporting substrate, and
   said silane coupling agent film is formed on the side of the light beam incidence.

6. A method for producing an optical information medium according to claim 5 wherein said optical information medium is a magneto-optical disk used by magnetic field modulation process which has a recording layer formed on the supporting substrate, wherein the recording and the reading is accomplished by irradiating a light beam from the side of the medium containing said supporting substrate, and wherein a magnetic head is run on the side of the medium containing said recording layer, and
   said disk is coated with said silane coupling agent film on both the side of the light beam incidence and the side of the magnetic head.

7. A method for producing an optical information medium according to claim 1, which comprises the further step of forming said film of a silane coupling agent in contact with said underlying layer.

8. A method for producing an optical information medium to be optically recorded and/or read, wherein said medium comprises, a coating on at least one surface of the medium of a film of a chemisorbed silane coupling agent containing a water- or oil-repellent substituent, said silane coupling agent being represented by the following formula (1):

wherein $R_1$ is the water- or oil-repellent substituent; X, Y and Z are independently a monovalent group; and at least one of X, Y and Z is a group which is capable of forming Si—O—Si bond by polycondensation with silanol group; and said medium has an underlying layer formed in contact with said silane coupling agent film, and said underlying layer has a surface comprising a thin layer of a metal (including a semimetal) compound having a thickness of up to 1 μm formed in contact with said silane coupling agent film, and a metal (including a semimetal) compound-containing layer having a thickness thicker than said thin layer is formed in contact with said thin layer and on the side of the thin layer opposite to said silane coupling agent film the metal compound containing thicker layer comprising an active energy beam-curable resin containing particles of a metal (including a semimetal) compound which comprises forming said metal compound containing thicker layer by coating a surface of the optical information medium with said active energy beam-curable resin containing said particles and heat drying.

9. A method for producing an optical information medium according to claim 8 wherein said metal (including a semimetal) compound-containing layer formed in contact with said thin layer comprises an active energy beam-curable resin containing particles of a metal compound selected from a metal (including semimetal) chalcogenide, a metal (including semimetal) nitride, and a metal (including semimetal) carbide; and said metal compound particle has an average particle size of up to 500 nm.

10. A method for producing an optical information medium according to claims 2 or, 9, wherein said metal chalcogenide particle is a silica particle.

11. A method for producing an optical information medium according to claim 8, wherein the substituent $R_1$ in formula (1) is a water- or oil-repellent fluorohydrocarbon substituent.

12. A method for producing an optical information medium according to claim 8, wherein at least one of X, Y and Z in formula (1) is selected from a halogen, ——OH, —$OR_2$, wherein $R_2$ is an alkyl group, —OC(O)CH$_3$, —NH$_2$ and —N=C=O.

13. A method for producing an optical information medium according to claim 8, wherein said medium has a recording and/or reading layer formed on a supporting substrate, and the recording and/or the reading is accomplished by irradiating a light beam from the side of the medium containing said supporting substrate, and said silane coupling agent film is formed on the side of the light beam incidence.

14. A method for producing an optical information medium according to claim 13, wherein said optical information medium is a magneto-optical disk used by magnetic field modulation process which has a recording layer formed on the supporting substrate, wherein the recording and the reading is accomplished by irradiating a light beam from the side of the medium containing said supporting substrate, and wherein a magnetic head is run on the side of said recording layer, and said disk is coated with said silane coupling agent film on both the side of the light beam incidence and the side of the magnetic head.

15. A method for producing an optical information medium according to claim 8 which comprises the further steps of forming said thin layer of a metal compound and said film of a silane coupling agent in contact with said thin layer of a metal compound.

16. A method for producing an optical information medium comprising a supporting substrate and a film layer formed on the supporting substrate to be optically recorded and/or read by a light beam irradiated from the side of the medium containing said supporting substrate or said film layer, wherein said medium is coated on the side of the light incidence with a thin layer having a thickness of up to 1 μm comprising a metal (including a semimetal) compound selected from a metal (including semimetal) chalcogenide, a metal (including semimetal) nitride, and a metal (including semimetal) carbide, and a metal (including a semimetal) compound-containing layer having a thickness thicker than said thin layer is formed in contact with said thin layer and on the side opposite to the side of the light incidence which comprises an active energy beam-curable resin containing particles of a metal compound selected from a metal (including semimetal) chalcogenide, a metal (including semimetal) nitride, and a metal (including semimetal) carbide; and said metal compound particle has an average particle size of up to 500 nm, which comprises forming said metal compound-containing thicker layer by coating a surface of the optical information medium with said active energy beam-curable resin containing said particles and heat drying.

17. A method for producing an optical information medium according to claim 16, which comprises the further step of forming said thin layer as a coating in contact with said metal compound-containing thicker layer.

18. A method for producing an optical information medium comprising a supporting substrate and a film layer formed on the supporting substrate to be optically recorded and/or read by a light irradiated from the side of said supporting substrate or said film layer, wherein said medium comprises a coating on the side of the light incidence of a thin layer having a thickness of up to 1 μm comprising hard carbon (diamond like carbon), and a metal (including a semimetal) compound-containing layer having a thickness thicker than said thin layer formed in contact with said thin layer and on the side opposite to the side of the light incidence which comprises an active energy beam-curable resin containing particles of a metal compound selected from a metal (including semimetal) chalcogenide, a metal (including semimetal) nitride, and a metal (including semimetal) carbide; and said metal compound particle has an average particle size of up to 500 nm, which comprises forming said metal compound-containing thicker layer by coating a surface of the optical information medium with said active energy beam-curable resin containing said particles and heat drying.

19. The method for producing an optical information medium according to claim 18 which comprises the further step of forming said thin layer as a coating in contact with said metal-compound containing thicker layer.

20. A method for producing an, optical information medium comprising a supporting substrate and a film layer formed on the supporting substrate which is optically recorded and/or read by irradiating a light beam from the side of the medium containing said supporting substrate or said film layer, wherein said medium is formed on the side of the light incidence with a light-transmitting layer; and at least a part of said light-transmitting layer comprises an active energy beam-curable resin containing particles of a metal compound selected from a metal (including semimetal) chalcogenide, a metal (including semimetal) nitride, and a metal (including semimetal) carbide; and said metal compound particle has an average particle size of up to 500 nm, which comprises forming said light-transmitting layer by coating a surface of the optical information medium with said active energy beam-curable resin containing said particles and heat drying.

21. A method for producing an optical information medium according to claims 9 or 20 wherein said metal compound particle is a metal chalcogenide particle.

* * * * *